(12) United States Patent
Barrieau

(10) Patent No.: US 11,347,985 B2
(45) Date of Patent: May 31, 2022

(54) METHOD AND SYSTEM OF GRANTING CONTROL ACCESS VIA QR CODE

(71) Applicant: JOHNSON CONTROLS TYCO IP HOLDINGS LLP, Milwaukee, WI (US)

(72) Inventor: Christopher Mark Barrieau, Shirley, MA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/066,202

(22) Filed: Oct. 8, 2020

(65) Prior Publication Data

US 2021/0110226 A1   Apr. 15, 2021

Related U.S. Application Data

(60) Provisional application No. 62/912,996, filed on Oct. 9, 2019.

(51) Int. Cl.
*G06K 19/06* (2006.01)
*G08B 25/14* (2006.01)

(52) U.S. Cl.
CPC ....... *G06K 19/06037* (2013.01); *G08B 25/14* (2013.01)

(58) Field of Classification Search
CPC ... G06K 19/06037; G08B 25/14; G08B 29/12
See application file for complete search history.

(56) References Cited

U.S. PATENT DOCUMENTS

| 2005/0258250 A1* | 11/2005 | Melick | G06K 17/00 235/462.46 |
| 2013/0117078 A1* | 5/2013 | Weik, III | E05F 15/70 705/13 |
| 2015/0341336 A1* | 11/2015 | Trell | H04L 67/125 726/5 |

FOREIGN PATENT DOCUMENTS

CN   106710043   *   5/2017   ............... G07C 9/27

* cited by examiner

*Primary Examiner* — Hongmin Fan
(74) *Attorney, Agent, or Firm* — ArentFox Schiff

(57) ABSTRACT

A method of granting control access comprises displaying a QR code on a fire panel annunciator. A user device captures the QR code, extracts information from it, and forwards the extracted information to the fire panel. If the fire panel verifies that the extracted information is valid, the panel grants temporary control access to the user device.

24 Claims, 2 Drawing Sheets

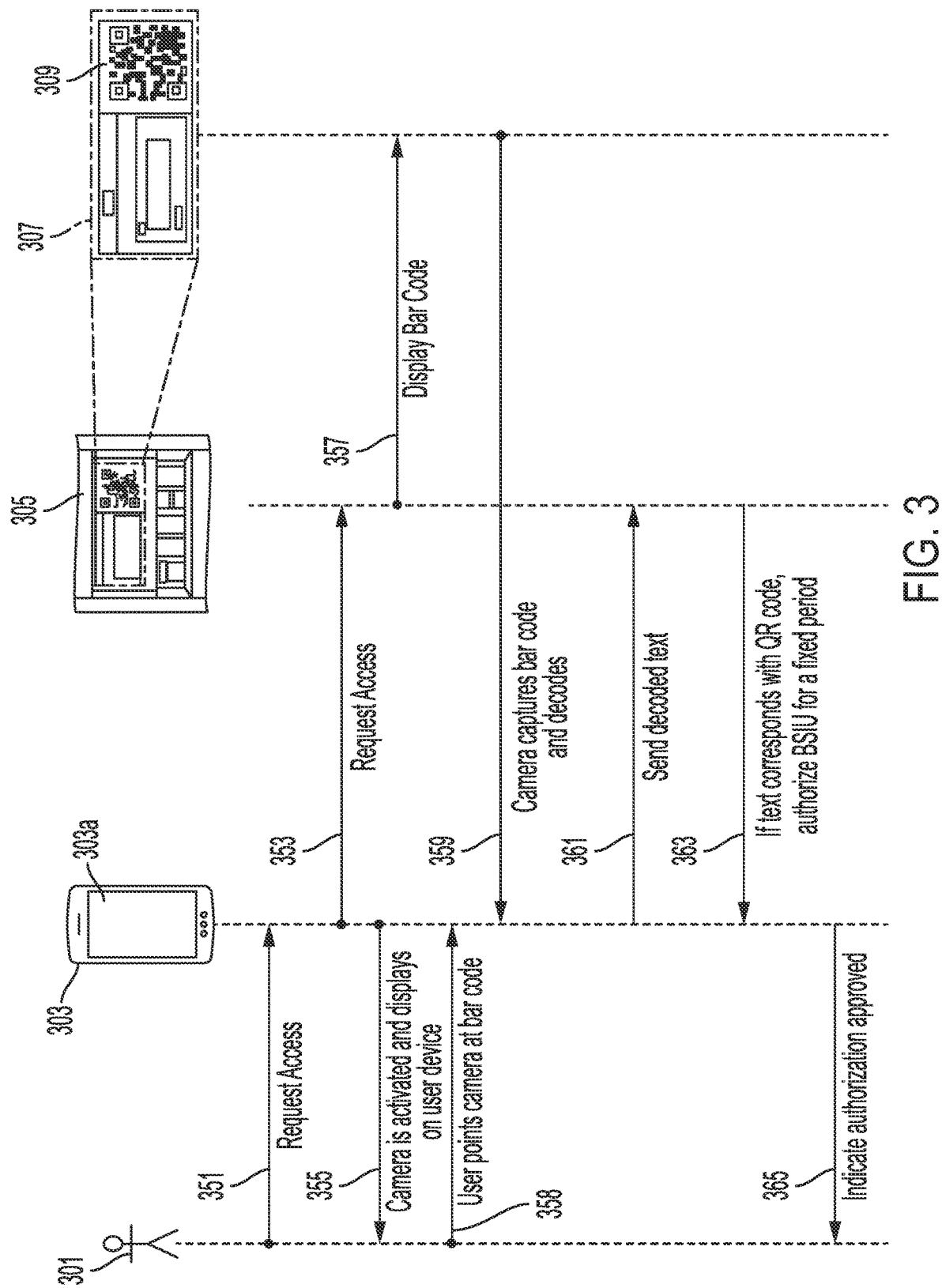

METHOD AND SYSTEM OF GRANTING CONTROL ACCESS VIA QR CODE

CROSS-REFERENCE TO RELATED APPLICATION

This application claims the benefit of U.S. Provisional Application Ser. No. 62/912,996, entitled "QR CODE PROXIMITY TESTING" and filed on Oct. 9, 2019, the disclosure of which is expressly incorporated by reference herein in its entirety.

BACKGROUND

A Building System Information Unit (BSIU) is a non-UL listed computer-based electronic device that is intended to display building information and execute system control functions, including fire system information display and control. Examples are smartphones, tablets and personal computers.

A Fire Alarm Control Unit (FACU) is a computer-based electronic device, e.g., a fire alarm panel, that is intended to display building information and execute system control functions such as alarm silence, system reset, alarm acknowledgment, changing of point states (such as turning points on or off) including fire system information display and control.

UL currently requires that devices must be UL listed in order to perform control operations on a fire alarm network. Such operations may include, but are not limited to, acknowledging alarms, silencing sounders, etc. UL states that BSIUs can perform these functions if they are within visible sight of a FACU.

SUMMARY

It is preferable to allow a technician to perform certain control functions when within visible sight of a UL listed annunciator (such as, for example, a display on the fire alarm panel), while providing information but no control when there is no such visibility.

In an embodiment, a method of granting control access comprises displaying a pattern on a fire panel annunciator. The pattern may comprise any of, but is not limited to, a QR code, a 2D code, or a bar code. A user device may capture the pattern, extract information such as a timestamp and/or Globally Unique ID (GUID) from the pattern, and forward the extracted information to the fire panel. If the fire panel verifies that the extracted information is valid, e.g., corresponds with the displayed pattern, the panel may grant control access to the user device.

In another embodiment, a BSIU, such as a smartphone or tablet, sending an access request to a FACU. The FACU, upon receiving the request, displays a QR code which may include a timestamp, for example a date and time of the request, and a GUID. The BSIU may then capture an image of the QR code, for example with a built-in camera, decode the QR code, and forward a portion of the decoded QR code to the FACU. The FACU, upon receiving the portion of the decoded QR code, may validate that the received portion of the decoded QR code corresponds with the displayed QR code, and if the received decoded portion of the QR code is valid, the FACU may grant control access to the BSIU for a predetermined period of time (a control access window). The control access window period may be configurable.

When the control access window expires, the control access that had been granted to the BSIU may be withdrawn. The BSIU may indicate (for example visually, by audio or by vibration) that it is actively scanning to capture the image. When control access is granted, the BSIU may indicate that control access has been granted. Indications may be provided, for example visually, or by audio or voice or by vibration. Once control access has been granted, the BSIU may display or otherwise indicate the time remaining before control access is withdrawn. This indication may be updated at regular intervals.

In another embodiment, a system comprises a user device, a fire alarm panel and a display in communication with the fire alarm panel. The user device may be configured to detect a command from a user to request control access to the fire alarm panel and to send an access request to the fire alarm panel.

The fire alarm panel may, upon receipt of the request, cause the display to display a pattern, said pattern containing access information.

The user device be further configured to scan and capture an image of the pattern, extract the access information from the pattern, and forward a message derived from the extracted access information code to the fire alarm panel.

The fire alarm panel may receive the message and validate the received message by confirming that the received message corresponds with the displayed pattern. If the received message is valid, the fire alarm panel may grant control access to the user device for a predetermined duration (the control access window), for example 2-3 minutes. The fire alarm panel may further cause the display to stop displaying the pattern after a predetermined scan window. The fire alarm panel may reject the received message if said message is received if the scan window has expired, preferably when the panel causes the pattern to stop being displayed on the annunciator.

BRIEF DESCRIPTION OF THE DRAWINGS

FIG. 3 is a sequence drawing illustrating the sequence of events and communications.

DESCRIPTION

Embodiments of the present invention use QR proximity testing to restrict the access of BSIUs (such as smartphones) that are not within visible sight, i.e., line of sight, of a FACU. A BSIU that is within visible sight of a FACU may request and receive control permissions. The BSIU's camera may image a QR code that contains an encoded message authorizing access. The BSIU then sends the code or message to the FACU, or a portion thereof, which then validates the code and authorize access for a time period.

The QR code validates that the operator is in the room with the panel (or at least within direct line-of-sight) and grants access to perform an operation for a limited time. After the end of the period, it is necessary to request reauthorization in order to continue to perform controls from the BSIU. The allowed interval is purposely small so as to ensure that the operator is nearby. While it may be configurable, an authorization interval of one to two minutes is considered optimal. So while performing operations, the operator does not need to stand right at the panel using the panel interface, but rather can stand or sit elsewhere in the room while performing operations from the BSIU.

Without authorization, the technician my only receive information, but not have access to any controls.

Figure 1:
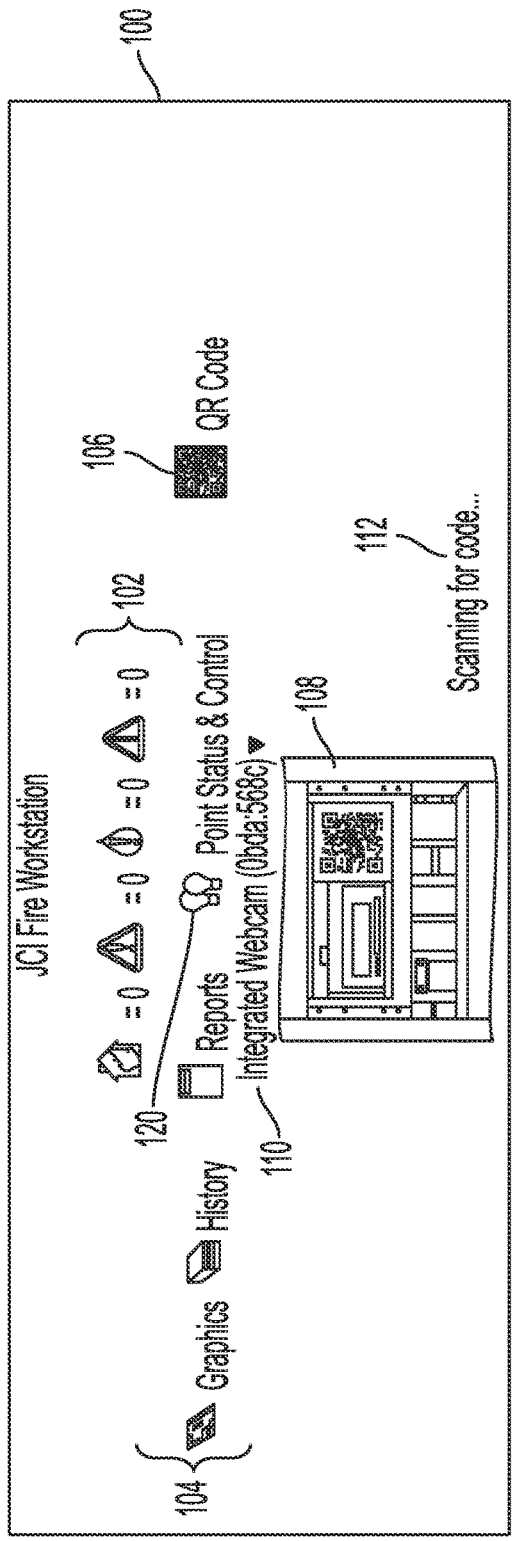
FIG. 1 is an illustration of a user interface while scanning a QR code.

FIG. 1 illustrates an exemplary user interface 100 that might appear on a computer or tablet/smartpad. Due to its small size, a smartphone would likely have a similar but different layout. Icons 102 represent various events, such as fire, priority 2, supervisory, and trouble with corresponding counts of the number of devices currently in the respective indicated abnormal states. The user can bring up other screens by selecting one of the option icons 104. For example, selecting the Graphics icon may bring up a graphic display of the facility, selecting the History icon may display the history of incidents, and selecting the Reports icon may display various reports that have previously been generated or enable the user to generate a report.

Of particular interest are the Point Status & Control icon 120 and the QR code icon 106. Selecting the Point Status & Control icon 120 may display a user interface (not shown) that allows a user to observe the status of various points on the system, for example, by selecting a point to view information on that point's state, and optionally, to send a command to change its state (control operations). Ordinarily, no control operations are available to the user from the interface. When no control operations are available, the QR code icon 106 may provide some indication such as appearing black (or some other color), having a black outline, or some other way of indicating that controls are not available.

When the user selects the QR code icon 106, it may turn red, or blink or provide some other indication that it is now looking for a QR code. Text such as "Scanning for code . . ." 112 may also provide such indication. A scan window 108 appears, and a drop-down menu 110 allows the user to select a camera with which to scan the QR code. For example, a smartphone may have one or more cameras on the front face and one or more cameras on the back face.

The user device then sends a request to the fire panel, and in response to receiving the request, the panel may display a coded pattern, such as a QR code, on its annunciator. With the help of the scanning window 108, the user may then point the user device or whatever device has been selected by the drop down menu 110 at the displayed QR code. This confirms that the user is within line of sight of the panel.

The user device may capture the image, and then decode the QR code. The QR code may contain certain information such as a timestamp and a globally unique identifier (GUID). The user device may optionally verify that the information is valid, and transmit at least a portion of the certain information back to the panel. The panel verifies that the portion of certain information that it receives from the user device corresponds to what was contained in the displayed QR code, and signals that controls may now be activated from the user device.

Figure 2:
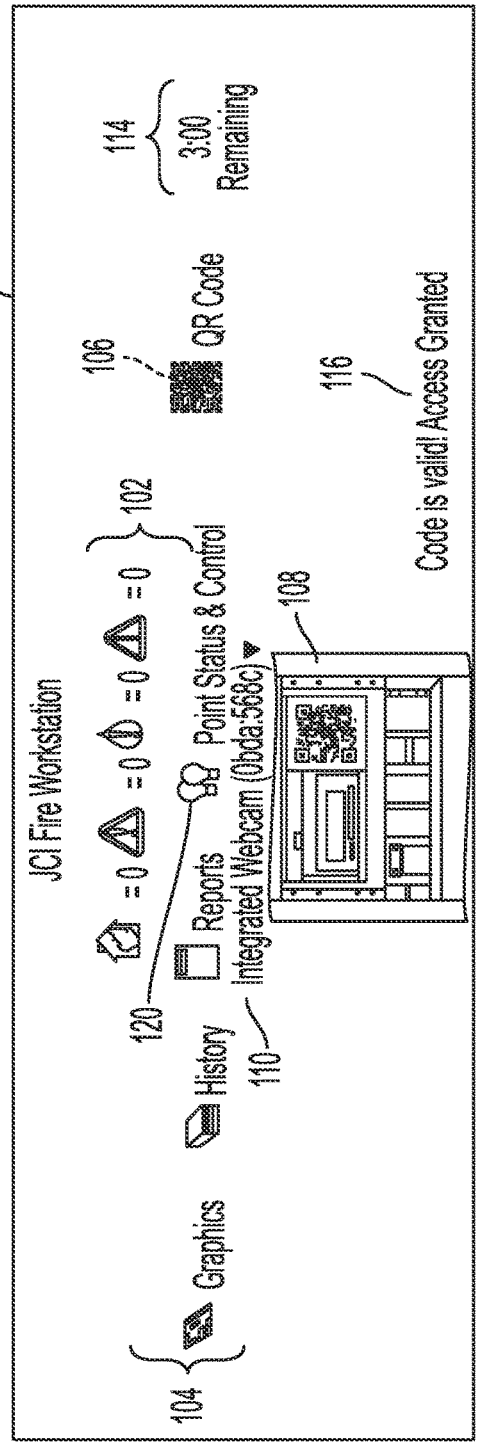
FIG. 2 is an illustration of the user interface after a user has been granted control access.

FIG. 2 illustrates one manner in which this acknowledgement is indicated to the user. The QR code icon 106 may, for example, turn green, stop blinking if it had been blinking, or provide some other indication. Text 116 may also indicate that the QR code has been validated and that the user has been granted control access.

To ensure that the user is always near the panel, control access is only granted for a short "control access window" time, for example, 2 or 3 minutes. This time may be configurable. A "time remaining" text 114 appears and notifies the user as to how much time is left. The time remaining may be tracked locally on the user device, then updated to the UI to indicate control has expired. Alternatively, the time remaining may be periodically forwarded to the user device from the control panel. After the control access window closes, commands will no longer be accepted by the front panel; the QR code icon 106 will change its appearance to indicate controls are no longer available and the text 116 will go away or otherwise indicate that the user has no control access. The user may then initiate another control access window by repeating the procedure, beginning with requesting a new QR code by selecting the QR code icon 106.

FIG. 3 illustrates the various actions and communications that occur among the user 303, the user device, here shown as a smartphone 303 executing a fire detection workstation app 303a, and the fire panel 305. The actions described herein, or anywhere else in this document, performed by the user device/smartphone 303, by the fire panel 305, and/or by the BSIU, may be performed by a processor executing computer-readable instructions, such as first detection workstation app 303a, stored in a memory. In FIG. 3, it is assumed that the user has already logged in to the workstation app 303a, has been authenticated and authorized to use the app, and has selected a panel to communicate with. The selected panel 305 communicates with a display 307, which may be integrated into the panel.

At step 351, the user 301 requests control access by selecting the QR code icon 106 displayed by the workstation app. In response, the user device 303 transmits (step 353) an Access Request to the panel 305 and activates (step 355) the selected camera. The Access Request may include at least a timestamp indicating, for example, the current time, i.e., the time the QR code is being generated and a GUID identifying the selected panel.

Upon receiving and validating the Access Request, the panel 305 generates and causes the annunciator 307 to display a QR code (step 357).

The user 301 may then point the selected camera at the displayed QR code 309 (step 358). The user device 303 may scan, decode and validate the QR code (step 359). If the decoded code is deemed valid by the app, the user device 303 may then transmit (step 361) some or all of the text embedded in the decoded code (for example, other text based on the code) to the panel 305. If the panel 305 verifies that the received text corresponds with the displayed QR code 309, it enables a control access window for a predetermined time, which may be configurable, and transmits (step 363) an authorization to the user device 303.

When the user device 303 receives the authorization, it indicates to the user 301 in step 365 that control access has been granted, as described above.

It would be recognized by those of skilled in the art that codes other than QR codes may be used. Other types of codes may be, for example, bar code, other 2D codes, graphics (using image recognition), text (using character recognition), etc. For example, a particular shape may be displayed, captured/interpreted and sent back to panel.

The displayed code, whether it be a QR code, 2D code, bar code or some other format, may contain various information including, but not limited to: a time stamp at time of the request, name of requestee (panel ID). There may be a log-in protocol—operator will have already logged in. A request to the panel may be sent using web socket protocol or any other practical wireless means such as WiFi, Bluetooth, etc.

What is claimed is:

1. A method of granting control access, comprising the steps of:

a building system information unit (BSIU) sending an access request to a fire alarm control unit (FACU);

the FACU, upon receiving the access request, displaying a displayed quick response (QR) code;

the BSIU:
- capturing an image of the displayed QR code,
- decoding the displayed QR code to generate a decoded QR code, and
- forwarding a portion of the decoded QR code to the FACU; and the FACU:
- receiving the portion of the decoded QR code,
- validating that the portion of the decoded QR code corresponds with the displayed QR code, and
- if the portion of the decoded QR code is valid, granting control access to the BSIU for a predetermined period of time defined by a control access window.

2. The method of claim 1, wherein the control access window is configurable.

3. The method of claim 1, wherein when the control access window expires, the control access is withdrawn.

4. The method of claim 1, wherein the BSIU is configured to capture the displayed QR code with a built-in camera.

5. The method of claim 1, wherein the BSIU is a smartphone or a tablet.

6. The method of claim 1 wherein the displayed QR code comprises date and time information.

7. The method of claim 1, wherein the displayed QR code comprises a GUID.

8. The method of claim 1, wherein the portion of the decoded QR code comprises all of the decoded QR code.

9. The method of claim 1, wherein the BSIU displays a first indication indicating that it is actively scanning to capture the image.

10. The method of claim 9, wherein when control access is granted, the first indication is replaced with a second indication indicating that control access has been granted.

11. The method of claim 9, wherein when control access is granted, the BSIU displays an indication of time remaining until control access is withdrawn.

12. The method of claim 11, wherein the indication of time remaining is updated at regular intervals.

13. A system, comprising:
a building system information unit (BSIU) configured to send an access request to a fire alarm control unit (FACU);

the FACU configured to display a displayed quick response (QR) code, upon receiving the access request;

the BSIU configured to:
- capture an image of the displayed QR code,
- decode the displayed QR code to generate a decoded QR code, and
- forward a portion of the decoded QR code to the FACU; and the FACU configured to:
- receive the portion of the decoded QR code,
- validate that the portion of the decoded QR code corresponds with the displayed QR code, and
- if the portion of the decoded QR code is valid, the FACU may be configured to grant control access to the BSIU for a predetermined period of time defined by a control access window.

14. The system of claim 13, wherein the control access window is configurable.

15. The system of claim 13, wherein when the control access window expires, the control access is withdrawn.

16. The system of claim 13, wherein the BSIU is configured to capture the displayed QR code with a built-in camera.

17. The system of claim 13, wherein the BSIU is a smartphone or a tablet.

18. The system of claim 13, wherein the displayed QR code comprises date and time information.

19. The system of claim 13, wherein the displayed QR code comprises a GUID.

20. The system of claim 13, wherein the portion of the decoded QR code comprises all of the decoded QR code.

21. The system of claim 13, wherein the BSIU displays a first indication indicating that it is actively scanning to capture the image.

22. The system of claim 21, wherein when control access is granted, the first indication is replaced with a second indication indicating that control access has been granted.

23. The system of claim 13, wherein when control access is granted, the BSIU displays an indication of time remaining until control access is withdrawn.

24. The system of claim 23, wherein the indication of time remaining is updated at regular intervals.

* * * * *